(12) United States Patent
Mori

(10) Patent No.: US 9,253,246 B2
(45) Date of Patent: Feb. 2, 2016

(54) INFORMATION DEVICE AND NETWORK SYSTEM

(71) Applicant: Brother Kogyo Kabushiki Kaisha, Nagoya-shi, Aichi-ken (JP)

(72) Inventor: Takafumi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/329,219

(22) Filed: Jul. 11, 2014

(65) Prior Publication Data

US 2015/0020169 A1 Jan. 15, 2015

(30) Foreign Application Priority Data

Jul. 12, 2013 (JP) ................. 2013-146254

(51) Int. Cl.
*H04L 29/06* (2006.01)
*H04L 29/08* (2006.01)

(52) U.S. Cl.
CPC .............. *H04L 67/02* (2013.01); *H04L 63/083* (2013.01)

(58) Field of Classification Search
CPC ..................................... H04L 63/083
USPC ............................................. 726/4
See application file for complete search history.

(56) References Cited

U.S. PATENT DOCUMENTS 7,581,244 B2 * 8/2009 Li et al. ............................ 726/5
8,166,531 B2 4/2012 Suzuki
8,407,769 B2 * 3/2013 Salmela et al. .................. 726/6
2003/0159031 A1 8/2003 Muller et al.
2005/0033994 A1 2/2005 Suzuki (Continued)

FOREIGN PATENT DOCUMENTS

EP 1 791 297 A1 5/2007
GB 2 403 577 A 1/2005

(Continued)

OTHER PUBLICATIONS

Sep. 16, 2014 (EP) Extended European Search Report—App 14176806.9.

(Continued)

*Primary Examiner* — Longbit Chai
(74) *Attorney, Agent, or Firm* — Banner & Witcoff, Ltd.

(57) ABSTRACT

A program when executed by a computer for controlling a registration server configured to be connected to a first network, causing the computer to execute: receiving user identification information; receiving device identification information from a communication terminal connected to a second network different from the first network, the device identification information being for identifying, on the second network, an information device connected to the second network; transmitting the received user identification information to a management server connected to the first network; receiving, from the management server, authentication information transmitted from the management server as a response to the transmitted user identification information; generating registration information which has a format in which the authentication information is allowed to be registered in the information device, the registration information including the authentication information and the device identification information; and transmitting the generated registration information to the communication terminal.

20 Claims, 11 Drawing Sheets

(56) References Cited

U.S. PATENT DOCUMENTS

2007/0256118 A1 11/2007 Nomura et al.
2008/0091835 A1 4/2008 Yuan
2012/0185928 A1 7/2012 Suzuki

FOREIGN PATENT DOCUMENTS

JP 2007-316678 A 12/2007
JP 2011-159232 A 8/2011

OTHER PUBLICATIONS

Chapter 13: Key Management Techniques—Handbook of Applied Cryptography, by A. Menezes, P. van Oorshot, and S. Vanstone, CRC Press, 1996, pp. 543 to 590.

* cited by examiner

INFORMATION DEVICE AND NETWORK SYSTEM

BACKGROUND

The present disclosure relates to a network system in which a management server and an information device perform communication on the basis of authentication information under communication control of a registration server, and particularly to a program for the registration server, the information device, a computer readable recording medium storing a program for the information device, and the network system.

There is known a network system in which a management server and an information device perform communication on the basis of authentication information. Specifically, such a network system is known which includes a management server, a control target device, and a service server. First, a user transmits a request for requesting issuing password to the management server through the service server, by use of a mobile phone. In response to this request, the management server issues a password, and notifies the password to the mobile phone through the service server. Next, the user registers the notified password in the control target device by use of the mobile phone. Then, the control target device uses the registered password to start communication with the management server.

SUMMARY

In the above described network system, in a case where the user desires to start communication between the management server and the control target device, the user needs to first request the management server to issue a password by use of the mobile phone, and then register the password in the control target device. As described above, in order to start communication between the management server and the control target device, the procedure which the user needs to perform is cumbersome. Therefore, there is a problem that the user cannot quickly and easily start communication between the management server and the control target device.

One of objects of the present disclosure is to provide a program for a registration server, an information device, a program for the information device, and a network system capable of quickly and easily starting a management server and a control target device.

One of aspects of the present disclosure provides the following arrangements:

A non-transitory computer-readable recording medium storing a program when executed by a computer for controlling a registration server configured to be connected to a first network, causing the computer to execute:

receiving user identification information;

receiving device identification information from a communication terminal connected to a second network different from the first network, the device identification information identifying, on the second network, an information device connected to the second network;

transmitting the received user identification information to a management server connected to the first network;

receiving, from the management server, authentication information which is transmitted from the management server as a response to the transmitted user identification information;

generating registration information which has a format in which the authentication information is allowed to be registered in the information device, the registration information including at least the authentication information and the device identification information; and transmitting the generated registration information to the communication terminal.

An information device configured to be connected to a second network comprising: a processor; and memory storing computer readable instructions, when executed by the processor, causing the information device to:

receive authentication information from a communication terminal connected to the second network, the authentication information being necessary to perform communication with a management server connected to a first network different from the second network;

store the received authentication information in the memory;

transmit a connection request including the authentication information to the management server;

receive a permission information from the management server in response to the transmitted connection request, the permission information being used when the information device communicates with the management server; and store the received permission information in the memory.

A non-transitory computer readable recording medium storing a program when executed by a computer for controlling an information device configured to be connected to a second network, causing the computer to execute:

receiving authentication information from a communication terminal connected to the second network, the authentication information being necessary to perform communication with a management server connected to a first network different from the second network;

storing the received authentication information in a first storage unit;

transmitting a connection request including the authentication information to the management server;

receiving a permission information from the management server in response to the transmitted connection request, the permission information being used when the information device communicates with the management server; and storing the received permission information in a second storage unit.

A network system comprising:

a registration server connected to a first network;

a management server connected to the first network; and an information device connected to a second network different from the first network, wherein the registration server includes:

a first processor; and first memory storing computer readable instructions, when executed by the first processor, causing the registration server to:

receive user identification information;

receive first device identification information from a communication terminal connected to the second network, the first device identification information identifying the information device on the second network;

transmit, to the management server, the user identification information received by the registration server;

receive authentication information from the management server when the management server transmits the authentication information as a response to the user identification information transmitted by the registration server;

generate registration information which has a format in which the authentication information is allowed to be registered in the information device, the registration information including at least the authentication information and the first device identification information; and transmit the generated registration information generated to the communication terminal, the information device includes:

a second processor; and second memory storing computer readable instructions, when executed by the second processor, causing the information device to:

receive the authentication information from the communication terminal;

store the authentication information received from the communication terminal, in the second memory;

transmit a connection request to the management server, the connection request including the authentication information and a second device identification information for identifying the information device;

receive permission information from the management server in response to the transmitted connection request, the permission information permitting the information device to perform secure communication with the management server; and store the received permission information in the second memory, and the management server includes:

a third processor; and third memory storing computer readable instructions, when executed by the second processor, causing the management server to:

receive the user identification information from the registration server;

generate the authentication information corresponding to the user identification information in response to the receipt user identification information from the registration server;

transmit the generated authentication information to the registration server;

store the user identification information received from the registration server and the generated authentication information in the third memory in association with each other;

receive the connection request from the information device;

determine whether the authentication information included in the received connection request is in the third memory;

generate the permission information when it is determined that the authentication information is in the third memory;

transmit the generated permission information to the information device; and store the second device identification information included in the connection request received by the management server and the generated permission information in the third memory in association with the user identification information and the authentication information which are stored in the third memory in association with each other.

DESCRIPTION OF EXEMPLARY EMBODIMENTS

Figure 1:
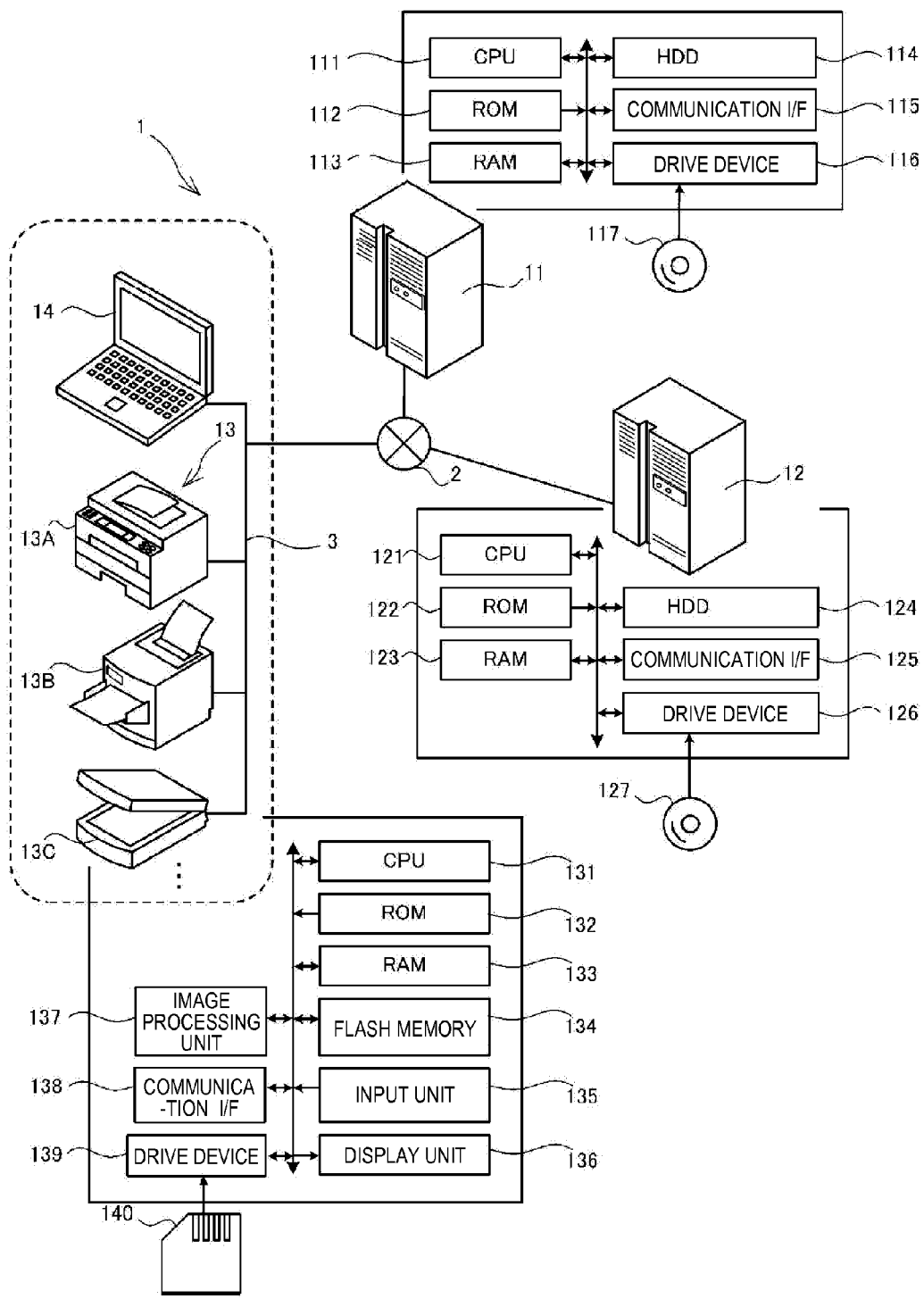
FIG. 1 is a view illustrating the outline of a network system 1, and the electrical configurations of a registration server 11, a management server 12, and an information device 13.

An embodiment according to the present disclosure will be described with reference to the accompanying drawings. With reference to FIG. 1, a network system 1 will be described. The network system 1 includes a registration server 11, a management server 12, a plurality of information devices 13, and a communication terminal 14. The registration server 11 and the management server 12 are connected to a first network 2, thereby capable of performing communication through the first network 2. The plurality of information devices 13 and the communication terminal 14 are connected to a second network 3, thereby capable of performing communication through the second network 3. The second network 3 is connected to the first network 2. The registration server 11 and the management server 12 can perform communication with the plurality of information devices 13 and the communication terminal 14 through the first network 2 and the second network 3. As the first network 2, a wide area network (WAN) can be exemplified. As the second network 3, a local area network (LAN) can be exemplified. Also, the second network 3 is not limited to a wired network, and may be a wireless network (such as Bluetooth®, or Wi-Fi).

The registration server 11 and the management server 12 are web servers. The information devices 13 include a copy machine 13A, a printer device 13B, and a scanner device 13C. The communication terminal 14 is a general-purpose computer. The registration server 11 and the management server 12 are not limited to web servers, and may be general-purpose PCs or servers having web server functions. Each information device 13 is not limited to the copy machine 13A, the printer device 13B, and the scanner device 13C, and may be a facsimile device, or may be a single multi-function device having the functions of a printer, a copier, a facsimile, a scanner, and the like. The communication terminal 14 is not limited to a general-purpose computer, and may be a portable terminal (such as a PDA, a smart phone, or a tablet computer).

Now, the electrical configuration of the registration server 11 will be described. The registration server 11 includes a CPU 111, which controls the registration server 11. The CPU 111 is electrically connected to a ROM 112, a RAM 113, a hard disk drive (HDD) 114, a communication interface (I/F) 115, and a drive device 116. In the ROM 112, a boot program, a Basic Input/Output System (BIOS), and the like are stored. In the RAM 113, a timer, a counter, and temporary data are stored.

In the HDD 114, a program for making the CPU 111 perform a registration server process (to be described below with reference to FIG. 4, 8, or 11), and an operating system (OS) are stored. Also, in the HDD 114, user IDs and passwords are stored. Hereinafter, when a user ID and a password are referred to as being in the HDD 114 of the registration server 11, the user ID and the password can be considered as having been registered in the registration server 11. The communication I/F 115 is an interface element for connecting the registration server 11 to the first network 2. Through the communication I/F 115, the CPU 111 performs data communication with other devices such as the management server 12 and the communication terminal 14. The drive device 116 can read information from a storage medium 117. The CPU 111 can read a program from a storage medium 117 by the drive device 116, and store the program in the HDD 114.

Also, as the CPU 111, a general-purpose processor can be used. The registration server process does not necessarily need to be performed by the CPU 111, and may be performed by any other electronic component (for example, an ASIC). Alternatively, the registration server process may be dispersively performed by a plurality of electronic devices (that is, a plurality of CPUs). For example, a part of the registration server process may be performed by a server connected to the first network 2. The program for the registration server process may be downloaded, for example, from a predetermined server connected to the first network 2, and be stored in the HDD 114.

Now, the electrical configuration of the management server 12 will be described. The management server 12 includes a CPU 121, which controls the management server 12. The CPU 121 is electrically connected to a ROM 122, a RAM 123, a HDD 124, a communication I/F 125, and a drive device 126. In the ROM 122, a boot program, a BIOS, and the like are stored. In the RAM 123, a timer, a counter, and temporary data are stored.

In the HDD 124, a program for making the CPU 121 perform a management server process (to be described below with reference to FIG. 6), and an OS are stored. Also, in the HDD 124, user IDs and passwords are stored. Hereinafter, when a user ID and a password are referred to as being in the HDD 124, the user ID and the password can be considered as having been registered in the management server 12. The communication I/F 125 is an interface element for connecting the management server 12 to the first network 2. Through the communication I/F 125, the CPU 121 performs data communication with other devices such as the registration server 11 and the plurality of information devices 13. The drive device 116 can read information from a storage medium 127. The CPU 121 can read a program from a storage medium 127 by the drive device 126, and store the program in the HDD 124.

Also, as the CPU 121, a general-purpose processor may be used. The management server process does not necessarily need to be performed by the CPU 121, and may be performed by any other electronic component (for example, an ASIC). Alternatively, the management server process may be dispersively performed by a plurality of electronic devices (that is, a plurality of CPUs). For example, a part of the management server process may be performed by a server connected to the first network 2. The program for the management server process may be downloaded, for example, from a predetermined server connected to the first network 2, and be stored in the HDD 124.

Next, the electrical configuration of an information device 13 will be described. The information device 13 includes a CPU 131, which controls the information device 13. The CPU 131 is electrically connected to a ROM 132, a RAM 133, a flash memory 134, an input unit 135, a display unit 136, an image processing unit 137, a communication I/F 138, and a drive device 139. In the ROM 132, a boot program, an OS, and a BIOS are stored. In the RAM 133, a timer, a counter, and temporary data are stored. Also, in the RAM 133, Personal Identification Number (PIN) codes (to be described below) are stored. In the flash memory 134, a program for making the CPU 131 perform an information device process (to be described below with reference to FIG. 5 or 9) is stored. Also, in the flash memory 134, a program (an Embedded Web Server (EWS) program) for making the information device 13 act as a web server is stored. Further, in the flash memory 134, tokens (to be described below) are stored. Furthermore, in the flash memory 134, data representing display screens are stored. The information device 13 can transmit the data representing display screens in response to requests from the communication terminal 14 such that a display unit of the communication terminal 14 displays the display screens.

The input unit 135 is composed of a touch panel and pushbuttons. The display unit 136 is a liquid crystal panel. The image processing unit 137 is a mechanism for forming images. For example, in a case where the information device 13 is the copy machine 13A, the image processing unit 137 includes an image reading mechanism and a printing mechanism. For example, in a case where the information device 13 is the printer device 13B, the image processing unit 137 includes a printing mechanism. For example, in a case where the information device 13 is the scanner device 13C, the image processing unit 137 includes an image reading mechanism. The communication I/F 138 is an interface element for connecting the information device 13 to the second network 3. In a case of connecting the information device 13 to the second network 3 by a cable, as the communication I/F 138, a wired communication circuit (such as a LAN card) may be used. In a case of wirelessly connecting the information device 13 to the second network 3, as the communication I/F 138, a wireless communication circuit (like an RF module such as Wi-Fi or Bluetooth) according to wireless standards may be used. Through the communication I/F 138, the CPU 131 performs data communication with other devices such as the management server 12 and the communication terminal 14. The drive device 139 can read information from a storage medium 140. The CPU 131 can read a program from a storage medium 140 by the drive device 139, and store the program in the flash memory 134.

Also, as the CPU 131, a general-purpose processor may be used. The information device process does not necessarily need to be performed by the CPU 131, and may be performed by any other electronic component (for example, an ASIC). Alternatively, the information device process may be dispersively performed by a plurality of electronic devices (that is, a plurality of CPUs). For example, a part of the information device process may be performed by a server connected to the second network 3. The program for the information device process may be downloaded, for example, from a predetermined server connected to the second network 3, and be stored in the flash memory 134. Also, PIN codes may be stored in the flash memory 134, not in the RAM 133. That is, PIN codes and tokens may be stored in different storage areas of the same storage device (the flash memory 134).

The management server 12 receives information stored in the information device 13, from the information device 13. In a case where the information device 13 is the copy machine 13A or the printer device 13B, the information stored in the information device 13 is information representing the number of printed media or the consumption degree of a consumable. The consumption degree of a consumable is, for example, information representing the value of a sensor which detects the residual amount of ink or toner. Also, in a case where the information device 13 is the scanner device 13C, the information stored in the information device 13 is information representing the number of revolutions of a roller for conveying documents or the number of conveyed documents. Hereinafter, this information will be referred to generally as device state information. The network system 1 is a system in which the management server 12 can receive the device state information from the information devices 13, and provide the device state information to a user. Also, the device state information is not limited to the above described device states.

In response to a request from the registration server 11, the management server 12 generates a PIN code for authenticating an information device 13. Thereafter, if data including a PIN code is received from the information device 13, the management server 12 performs authentication on the information device 13 by the PIN codes. In a case where the received PIN code coincides with the generated PIN code, the management server 12 determines that authentication has succeeded, and generates a token which is information for permitting the information device 13 to perform communication with the management server 12. Thereafter, the management server 12 transmits the token to the information device 13. The reason is that in order for the information device 13 to perform communication with the management server 12, the information device 13 needs to add the token to data (for example, data representing the device state information) to be transmitted to the management server 12. As described above, in order for an information device 13 to receive a token from the management server 12 and use the token to perform communication with the management server 12, the information device 13 needs to acquire a PIN code for authenticating the information device 13, from the management server 12.

The communication sequence of an information device 13 for acquiring the PIN code and using the token to start communication with the management server 12 will be described with reference to FIG. 2. First, in STEP S201, a user 14A performs a login operation on the communication terminal 14. The login operation is performed, for example, a login screen displayed on a browser executed by the communication terminal 14. The login operation is an operation of inputting identification information (hereinafter, referred to as a user ID) for identifying the user 14A, and a password to the login screen. The communication terminal 14 transmits the user ID and the password to the registration server 11 through the first network 2 and the second network 3. The registration server 11 receives the user ID and the password (STEP S203). As the user ID, the mail address of the user 14A can be exemplified.

More specifically, the communication terminal 14 transmits a HyperText Transfer Protocol (HTTP) request to the registration server 11, and receives an HTTP response for displaying the login screen, from the registration server 11. The HTTP response for displaying the login screen is a HTTP response described in a markup language such as a HyperText Markup Language (HTML) and including data representing the login screen. After the communication terminal 14 displays the login screen on the browser (STEP S202). If the user performs the login operation through the login screen (STEP S201), the communication terminal 14 transmits an HTTP request including an input user ID and an input password, to the registration server 11. Then, the registration server 11 receives the HTTP request (STEP S203).

In a case where the user ID and the password included in the received HTTP request has been registered, the registration server 11 controls the display unit of the communication terminal 14 such that the display unit displays a registration screen (hereinafter, referred to as a device registration screen) for registering an information device 13 (STEP S205). Specifically, in response to the received HTTP request, the registration server 11 transmits an HTTP response for displaying the device registration screen, to the communication terminal 14. The communication terminal 14 receives the HTTP response. On the basis of the received HTTP response, the communication terminal 14 displays the device registration screen on the browser.

Figure 3:
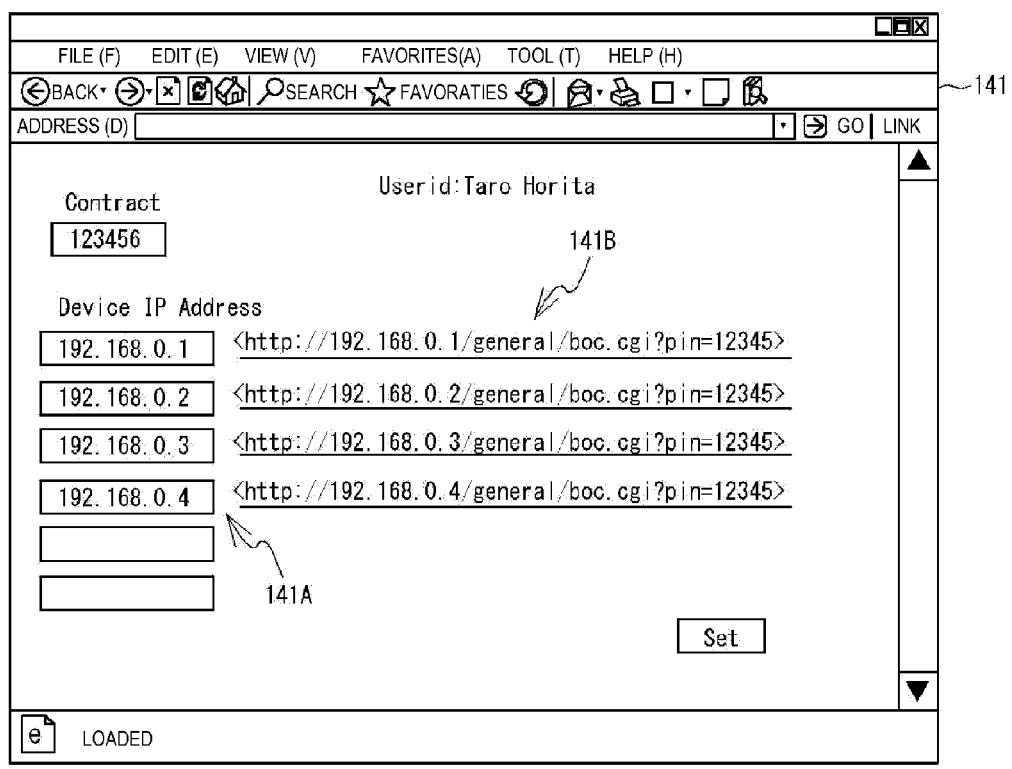
FIG. 3 is a view illustrating a device registration screen 141.

FIG. 3 shows an example (a device registration screen 141) of a device registration screen which is displayed on the browser which is executed by the communication terminal 14. The device registration screen 141 includes a plurality of input sections 141A. To each input section 141A, the IP address of an information devices 13 can be input. Also, in FIG. 3, the plurality of input sections 141A has been associated with URLs 141B, respectively. However, in the device registration screen which is displayed in STEP S205, any URL 141B is not displayed. Details of URLs 141B, and the display timing of URLs 141B will be described below.

Figure 2:
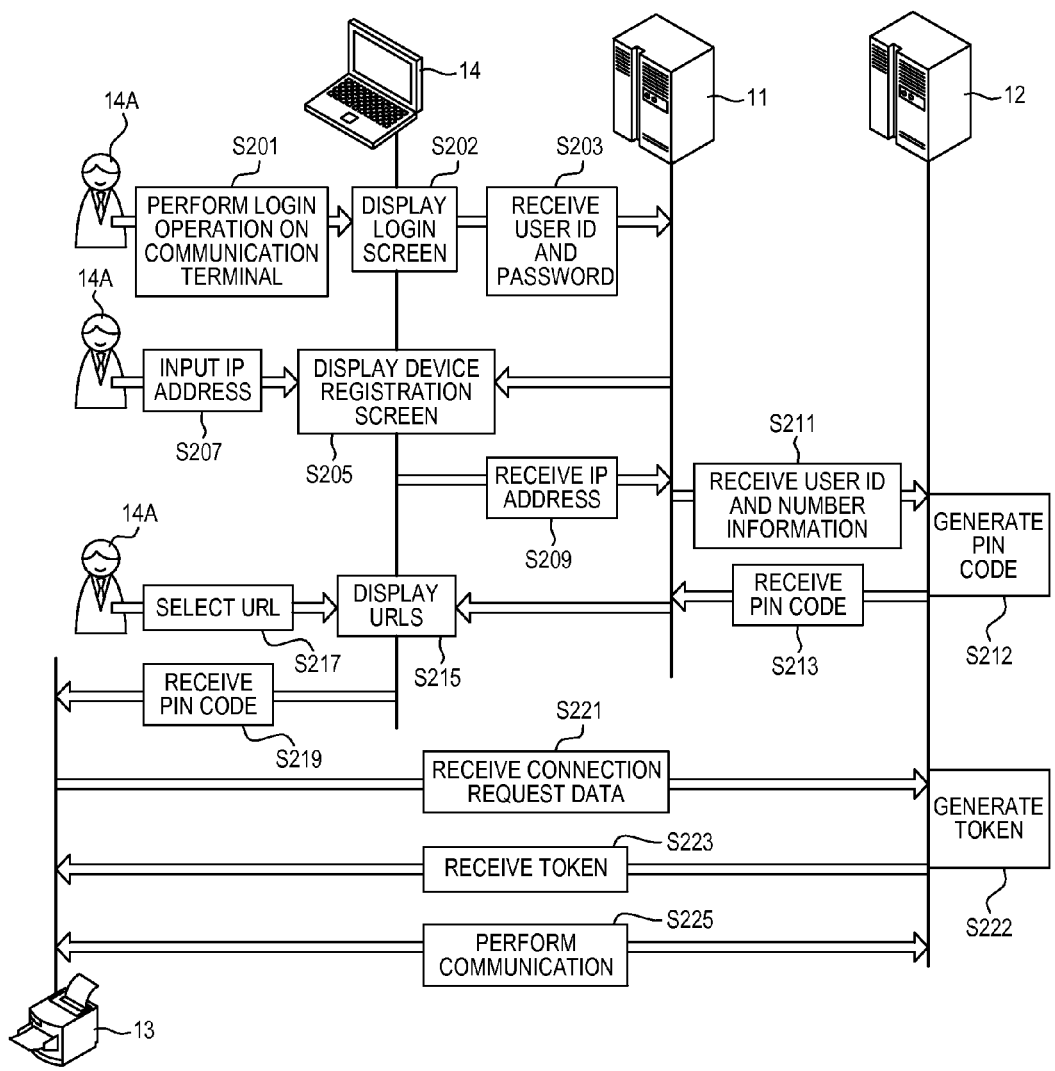
FIG. 2 is a view illustrating a communication sequence.

As shown in FIG. 2, in STEP S207, the user 14A inputs the IP address of an information device 13 whose device state information is desired to be managed by the management server 12, to an input section 141A of the device registration screen 141. The input IP address is address information, such as a local IP, capable of identifying the information device 13 in the second network 3. Next, the communication terminal 14 transmits the input IP address to the registration server 11. Also, in a case where a plurality of IP addresses is input to a plurality of input sections 141A, respectively, the communication terminal 14 transmits the plurality of input IP addresses to the registration server 11. In STEP S209, the registration server 11 receives the IP address. Specifically, the communication terminal 14 transmits an HTTP request including the input IP address, to the registration server 11. The registration server 11 receives the HTTP request.

Unlike the above description, the user 14A may input the domain name of the information device 13, instead of the IP address, as the address information for identifying the information device 13 in the second network 3, to the communication terminal 14. In this case, the communication terminal 14 may inquire of a DNS server connected to the second network 3, thereby specifying the IP address on the basis of the input domain name. Thereafter, the communication terminal 14 may transmit the IP address specified on the basis of the domain name, to the registration server 11. Alternatively, the communication terminal 14 may transmit the domain name of the information device 13 to the registration server 11. In this case, in STEP S215 (to be described below), URLs including domain names are displayed on the browser. Then, if the user selects a URL including the domain name in STEP S217 (to be described below), the communication terminal 14 inquires of a DNS server connected to the second network 3, thereby specifying the IP address on the basis of the domain name, and is connected to the information device 13 having the specified IP address.

In a case where the HTTP request is received, the registration server 11 requests the management server 12 to generate a PIN code. The PIN code which is requested to be generated is authentication information to be associated with the user ID included in the received HTTP request by the registration server 11 and to be used for the management server 12 to authenticate the information device 13. Specifically, the registration server 11 transmits the user ID received in STEP S203, and number information representing the number of IP addresses received in STEP S209, to the management server 12. The management server 12 receives the user ID and the number information (STEP S211). The management server 12 generates as many PIN codes for authenticating information devices 13 as a number represented by the number information. Alternatively, the management server 12 generates one PIN code regardless of the number represented by the number information. Next, the management server 12 transmits the generated PIN code to the registration server 11. The registration server 11 receives the PIN code (STEP S213).

Next, the registration server 11 generates a URL including the received PIN code and the IP address received in STEP S209. More specifically, the registration server 11 includes the IP address (for example, 192.168.0.1, 192.168.0.2, 192.168.0.3, or 192.168.0.4) (see FIG. 3) received in STEP S209, as a host name (the next portion of "http://") (see FIG. 3), in the URL. Also, the registration server 11 includes the PIN code (12345) (see FIG. 3) received in STEP S213, as a query (the next portion of "?pin=") (see FIG. 3), in the URL. In a case where a plurality of IP addresses is received in STEP S209, the registration server 11 generates URLs corresponding to the plurality of IP addresses, respectively.

The registration server 11 generates data on a device registration screen including the generated URL. For example, as shown in FIG. 3, a device registration screen 141 in which the generated URL 141B has been associated with a corresponding input section 141A to which the IP address has been input is generated. In response to the HTTP request received in STEP S209, the registration server 11 transmits an HTTP response for displaying the generated device registration screen, to the communication terminal 14. The communication terminal 14 receives the HTTP response. On the basis of the received HTTP response, the communication terminal 14 displays the device registration screen including URLs, on the browser (STEP S215).

In STEP S217, the user 14A inputs an operation of selecting a URL included in the device registration screen displayed on the browser, on the communication terminal 14. As described above, each URL included in the device registration screen includes an input IP address as a host name, and includes a PIN code generated by the management server 12, as a query. Therefore, if a URL is selected, the communication terminal 14 transmits an HTTP request including the PIN code of the URL, to an information device 13 identified by the IP address of the URL. The information device 13 receives the HTTP request (STEPS S219). The information device 13 executes the EWS program stored in the HDD 134, thereby performing communication of STEPS S221, S223, and S225 (to be described below) on the basis of HTTP.

The information device 13 specifies the PIN code included in the received HTTP request, and stores the PIN code in the RAM 133. The information device 13 transmits data (hereinafter, referred to as connection request data) for requesting generation of a token necessary to perform communication with the management server 12, as an HTTP request, to the management server 12. The connection request data includes the PIN code stored in the RAM 113. If the management server 12 receives the connection request data (STEP S221), the management server 12 performs authentication on the information device 13 by the PIN code included in the received connection request data. Thereafter, in STEP S222, the management server 12 generates a token.

The management server 12 transmits the generated token, as an HTTP response to the HTTP request of STEP S221, to the information device 13 which is the transmission source of the connection request data. The information device 13 receives the token, and stores the token in the flash memory 134 (STEP S223). Thereafter, the information device 13 adds the token stored in the flash memory 134, to data to be transmitted to the management server 12, thereby performing communication with the management server 12 (STEP S225). For example, the information device 13 adds the token to data representing the device state information, and transmits the data to the management server 12, whereby the management server 12 can receive the device state information from the information device 13. As described above, the management server 12 and the information device 13 perform communication using the token, whereby the management server 12 can prevent impersonation access from any other information device 13.

Unlike the above description, the communication terminal 14 may transmit data including the PIN code and having a predetermined format, instead of the HTTP request including the PIN code, to the information device 13. In this case, the information device 13 may receive the data including the PIN code and having the predetermined format, from the communication terminal 14, and specify the PIN code.

Figure 4:
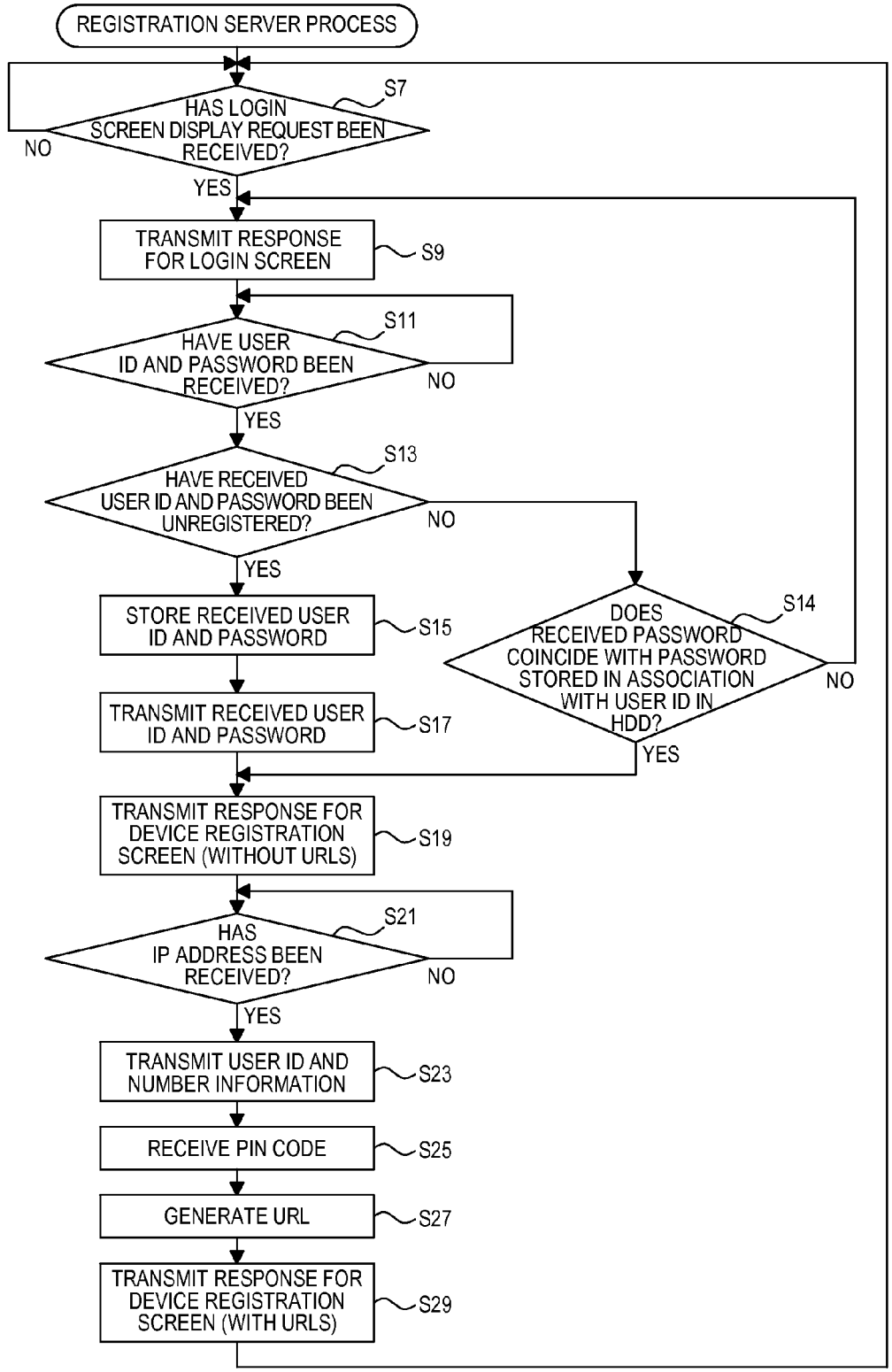
FIG. 4 is a flow chart illustrating a registration server process.
Figure 5:
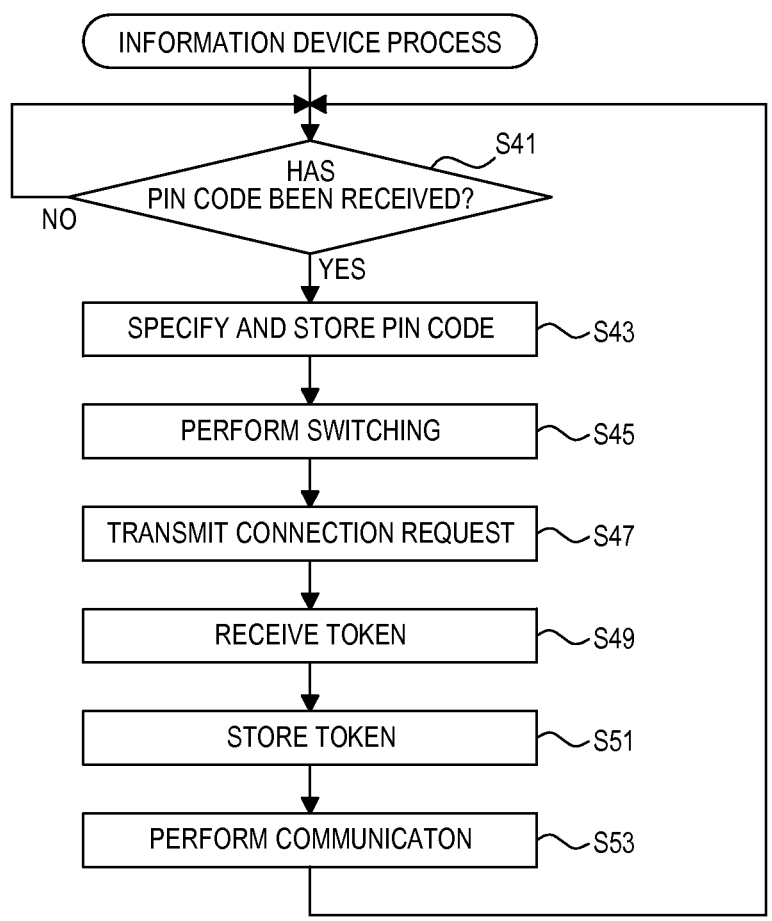
FIG. 5 is a flow chart illustrating an information device process.
Figure 6:
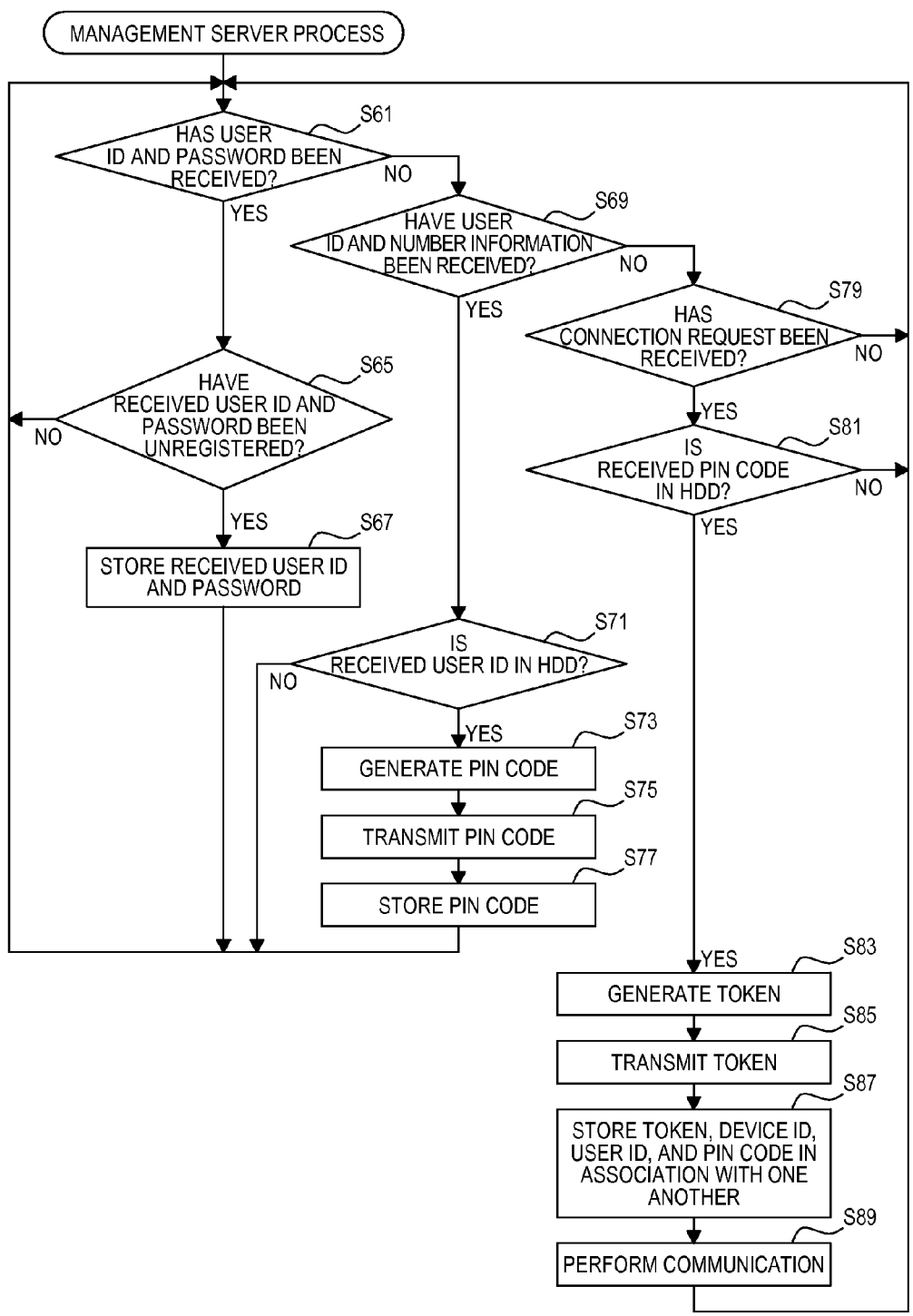
FIG. 6 is a flow chart illustrating a management server process.

Processes which the CPUs of the registration server 11, the management server 12, and the information device 13 perform on the basis of the communication sequence of FIG. 2 will be described with reference to FIGS. 4 to 6. With reference to FIG. 4, the registration server process which is performed by the CPU 111 of the registration server 11 will be described. If the registration server 11 is powered up, the CPU 111 reads the program stored in the HDD 114, and executes the program, thereby starting the registration server process. For example, the process shown in FIG. 4 is performed by the web server function of the registration server 11 which is implemented by execution of the program by the CPU 111. In STEP S7, the CPU 111 determines whether any HTTP request for requesting display of the login screen has been received from the communication terminal 14. In a case where it is determined that any HTTP request has not been received ("NO" in STEP S7), the CPU 111 returns to STEP S7. Meanwhile, in a case where it is determined that an HTTP request has been received ("YES" in STEP S7), in STEP S9, the CPU 111 transmits an HTTP response for displaying the login screen, to the communication terminal 14. The communication terminal 14 receives the HTTP response, and displays the login screen on the browser (STEP S202) (see FIG. 2)

In STEP S11, the CPU 111 determines whether any HTTP request including a user ID and a password has been received from the communication terminal 14. In a case where it is determined that any HTTP request has not been received ("NO" in STEP S11), the CPU 111 returns to STEP S11. In a case where the communication terminal 14 receives an operation of inputting a user ID and a password through the login screen, it transmits an HTTP request including the input user ID and the input password. If the HTTP request is received ("YES" in STEP S11), the CPU 111 specifies the user ID and the password included in the HTTP request. Thereafter, the CPU 111 compares the combination of the specified user ID and the specified password with combination of user IDs and passwords stored in the HDD 114, thereby determining whether the specified user ID is in the HDD 114. In a case where the specified user ID is not in the HDD 114, the CPU 111 determines that the specified user ID and the specified password have been unregistered in the registration server 11 ("YES" in STEP S13). Then, the CPU 111 transmits an HTTP response for displaying a display screen for inquiring about whether to register the specified user ID and the specified password, to the communication terminal 14. If notification data representing that it is desired to register is received from the communication terminal 14 in response to the transmitted HTTP response, in STEP S15, the CPU 111 stores the specified user ID and the specified password in the HDD 114, in association with each other. Thereafter, in order to register the specified user ID and the specified password in the management server 12, the CPU 111 transmits registration request data including the specified user ID and the specified password, to the management server 12 (STEP S17). Then, the CPU 111 proceeds to STEP S19.

Also, in a case where the specified user ID is in the HDD 114 ("NO" in STEP S13), if the specified password is different from a password stored in association with the user ID in the HDD 114 ("NO" in STEP S14), in order to make the user input a correct password, the CPU 111 returns to STEP S9. Meanwhile, if the specified password coincides with a password stored in association with the user ID stored the HDD 114 ("YES" in STEP S14), the CPU 111 determines that the specified user ID and the specified password have been registered in the registration server 11. Then, the CPU 111 proceeds to STEP S19.

In STEP S19, in response to the HTTP request, the CPU 111 transmits an HTTP response for displaying a device registration screen without URLs, to the communication terminal 14. The communication terminal 14 receives the HTTP response, and makes the browser display the device registration screen without URLs (STEP S205) (see FIG. 2). In STEP S21, the CPU 111 determines whether any HTTP request including an IP address has been received from the communication terminal 14. In a case where any HTTP request has not been received ("NO" in STEP S21), the CPU 111 returns to STEP S21. Meanwhile, if the communication terminal 14 receives an operation of inputting an IP address through the device registration screen, it transmits an HTTP request including the input IP address. If the HTTP response is received ("YES" in STEP S21), the CPU 111 specifies the IP address included in the HTTP request, and stores the specified IP address in the RAM 113. In STEP S23, the CPU 111 transmits the user ID included in the HTTP request received in STEP S11, and the number information representing the number of IP addresses included in the HTTP request received in STEP S21, to the management server 12. If the management server 12 transmits a PIN code as a response to the transmitted user ID and number information, the CPU 111 receives the PIN code (STEP S25).

In STEP S27, the CPU 111 generates an URL, which includes the IP address included in the HTTP request received in STEP S21, as a host name, and includes the PIN code received in STEP S25, as a query. Meanwhile, in a case where the HTTP request received in STEP S21 includes a plurality of IP addresses, the CPU 111 generates a plurality of URLs corresponding to the plurality of IP addresses, respectively. In STEP S29, the CPU 111 transmits an HTTP response for displaying a device registration screen including the generated URL, to the communication terminal 14. The communication terminal 14 receives the HTTP response, and makes the browser to display the device registration screen with URLs (STEP S215) (see FIG. 2). Then, the CPU 111 returns to STEP S7.

Now, the information device process which is performed by the CPU 131 of an information device 13 will be described with reference to FIG. 5. If the information device 13 is powered up, the CPU 131 reads the program stored in the flash memory 134, and executes the program, thereby starting the information device process. Also, the CPU 131 reads the EWS program stored in the flash memory 134, and executes the EWS program such that the information device 13 acts as a web server, thereby performing a communication process based on HTTP. Also, as described above, the flash memory 134 has the data on the display screens which the information device 13 can transmit such that a display unit of the communication terminal 14 displays the display screens. Specifically, the flash memory 134 has first data representing a display screen for receiving an input for a setting parameter of the information device 13, second data representing a display screen for notifying that the information device 13 cannot perform communication with the management server 12, and third data representing a display screen for notifying that the information device 13 can perform communication with the management server 12. Immediately after the information device process starts, if a display request (an HTTP request) is received from the communication terminal 14, the CPU 131 transmits a response (an HTTP response) including only the first data, to the communication terminal 14. Therefore, on the display unit of the communication terminal 14, the display screen based on the first data is displayed, and the display screens based on the second and third data are not displayed.

In STEP S41, the CPU 131 determines whether any HTTP request including a PIN code has been received. In a case where any HTTP request has not been received ("NO" in STEP S41), the CPU 131 returns to STEP S41. Meanwhile, in a case where an HTTP request has been received ("YES" in STEP S41), in STEP S43, the CPU 131 specifies the PIN code included in the received HTTP request, and stores the PIN code in the RAM 133. Then, in STEP S45, the CPU 131 performs state switching (e.g., setting state) such that if a display request is received from the communication terminal 14, it is possible to transmit the third data on the display screen for notifying that communication with the management server 12 is possible, to the communication terminal 14. Thereafter, if a display request is received from the communication terminal 14, the CPU 131 transmits the third data on the display screen including a character string, for example, "CONNECTION WITH MANAGEMENT SERVER HAS BEEN ESTABLISHED", together with the first data, to the communication terminal 14.

In STEP S47, the CPU 131 transmits connection request data including a device ID and the PIN code stored in the RAM 133, to the management server 12. The device ID is identification information for identifying the information device 13. The device ID is information unique to the information device 13, such as the MAC address or serial number of the information device 13. If the management server 12 transmits a token as a response to the connection request data, the CPU 131 receives the token (STEP S49). In STEP S51, the CPU 131 stores the received token in the flash memory 134. In STEP S53, the CPU 131 adds the token stored in the flash memory 134, to data, and transmits the data to the management server 12, thereby performing communication with the management server 12. Then, the CPU 131 returns to STEP S41.

Now, the management server process which is performed by the CPU 121 of the management server 12 will be described with reference to FIG. 6. If the management server 12 is powered up, the CPU 121 reads the program stored in the HDD 124, and executes the program, thereby starting the management server process. For example, the process shown in FIG. 6 is performed by the web server function of the management server 12 which is implemented by execution of the program by the CPU 121. In STEP S61, the CPU 121 determines whether any registration request data including a user ID and a password has been received from the registration server 11. In a case where registration request data including a user ID and a password has been received from the registration server 11 ("YES" in STEP S61), in STEP S65, the CPU 121 determines whether the user ID and the password included in the received registration request data are in the HDD 124. In a case where the user ID and the password included in the received registration request data are in the HDD 124, the CPU 121 determines that the received user ID and the received password have been already registered in the management server 12 ("NO" in STEP S65). Then, the CPU 121 returns to STEP S61.

Meanwhile, in a case where the received user ID and the received password are not in the HDD 124, the CPU 111 determines that the received user ID and the received password have been unregistered ("YES" in STEP S65). Subsequently, in STEP S67, the CPU 121 stores the received user ID and the received password in the HDD 124, in association with each other. Then, the CPU 121 returns to STEP S61. Also, although the received user ID is in the HDD 124, if the received password is different from a password stored in association with the user ID in the HDD 124, the CPU 121 determines that the received user ID has been registered in the registration server 11 ("NO" in STEP S65), but the received password is wrong. In this case, the CPU 121 returns to STEP S61.

Meanwhile, in a case where any registration request data including a user ID and a password has not been received from the registration server 11 ("NO" in STEP S61), in STEP S69, the CPU 121 determines whether a user ID and a number information have been received from the registration server 11. In a case where a user ID and number information have been received from the registration server 11 ("YES" in STEP S69), in STEP S71, the CPU 121 determines whether the received user ID is in the HDD 124. In a case where the received user ID is in the HDD 124 ("YES" in STEP S71), in STEP S73, the CPU 121 generates a PIN code capable of authenticating as many information devices 13 as a number represented by the received number information. In STEP S75, the CPU 121 transmits the generated PIN code to the registration server 11. In STEP S77, the CPU 121 stores the generated PIN code, the received user ID, and the received number information, in the HDD 124, in association with one another. Then, the CPU 121 returns to STEP S61.

Meanwhile, in a case where a user ID and number information have not been received from the registration server 11 ("NO" in STEP S69), in STEP S79, the CPU 121 determines whether any connection request data has been received from the information device 13. In a case where any connection request data has not been received ("NO" in STEP S79), the CPU 121 returns to STEP S61. Meanwhile, in a case where connection request data has been received ("YES" in STEP S79), in STEP S81, the CPU 121 determines whether a PIN code included in the connection request data is in the HDD 124, and a number represented by number information associated with the PIN code is 1 or greater. In a case where the PIN code included in the connection request data is not in the HDD 114, or in a case where the number represented by the number information stored in association with the PIN code of the connection request data in the HDD 124 is 0 ("NO" in STEP S81), the CPU 121 returns to STEP S61. In this way, the CPU 121 can limit the number of information devices 13 to use a generated PIN code to start communication, to a number represented by number information.

Meanwhile, in a case where the PIN code included in the connection request data is in the HDD 124, and the number represented by the associated number information is 1 or greater ("YES" in STEP S81), the CPU 121 subtracts 1 from the number represented by the number information, thereby updating the number information. In STEP S83, the CPU 121 generates a token. Subsequently, in STEP S85, the CPU 121 transmits the generated token to the information device 13. In STEP S87, the CPU 121 stores the token transmitted in STEP S85, and the device ID included in the connection request data in STEP S79, in the HDD 124, in association with the PIN code included in the connection request data and included in PIN codes stored in STEP S77, and the user ID stored in association with the PIN code of the connection request data in the HDD 124. Thereafter, the CPU 121 can specify a token for performing communication with an information device 13, for each device ID. In STEP S89, the CPU 121 receives data including a token from an information device 13, thereby performing communication with the information device 13. Then, the CPU 121 returns to STEP S61.

As described above, each URL which is generated in STEP S27 the CPU 111 of the registration server 11 has a format such that if the user of the communication terminal 14 selects the corresponding URL, the communication terminal 14 can transmit a PIN code to an information device 13. The communication terminal 14 can display a device registration screen including URLs, on the browser, on the basis of the HTTP request received from the registration server 11, such that at the timing when a URL is selected, it is possible to transmit a PIN code to an information device 13. If an information device 13 receives a PIN code, it can use the PIN code to receive a token from the management server 12, thereby starting communication with the management server 12. As described above, the CPU 111 of the registration server 11 makes the communication terminal 14 display a device registration screen including generated URLs. Therefore, the user can simply start communication between the management server 12 and an information device 13 only by selecting an URL. In this case, the user does not need to personally set a PIN code for an information device 13. Therefore, it is possible to simplify a procedure which the user performs to start communication between the management server 12 and the information device 13. Therefore, the user can quickly and easily start communication between the management server 12 and an information device 13.

Each URL which is generated in STEP S27 by the management server 12 includes the IP address of an information device 13, as a host name, and includes a PIN code as a query. Therefore, if the user selects a URL in a device registration screen displayed on the browser is selected, the communication terminal 14 can transmit a PIN code to an information device 13 by an HTTP request. For this reason, the registration server 11 makes the communication terminal 14 display a device registration screen including generated URLs, whereby it is possible to transmit a PIN code from the communication terminal 14 to an information device 13.

The CPU 111 of the registration server 11 receives an HTTP request including an IP address, from the communication terminal 14 ("YES" in STEP S21), thereby capable of specifying the IP address of an information device 13. In response to the HTTP request, the CPU 111 transmits an HTTP response including a PIN code, to the communication terminal 14 (STEP S29). As described above, since the registration server 11 can perform communication with the communication terminal 14 on the basis of a standardized protocol (HTTP), the registration server 11 can use a known communication terminal 14 capable of performing HTTP, to start communication between the management server 12 and an information device 13.

The CPU 111 of the registration server 11 transmits a user ID and number information to the management server 12 in STEP S23. On the basis of the number information, the management server 12 can specify the number of information devices 13 which can be authenticated by a PIN code to be generated. Therefore, the registration server 11 can receive a PIN code usable for as many information devices 13 as the number of IP addresses received in STEP S21 to perform communication with the management server 12, from the management server 12. The registration server 11 can prevent a larger number of information devices 13 than the number represented by the number information from performing communication with the management server 12, thereby keeping security of the network system 1.

The CPU 131 of an information device 13 can perform predetermined communication on the basis of a PIN code received from the communication terminal 14 (STEP S221 or S223) (see FIG. 2), thereby receiving a token from the management server 12. The information device 13 stores the received token in the flash memory 134, thereby capable of using the token to perform high-security communication with the management server 12.

Then, the CPU 131 of the information device 13 makes the display unit of the communication terminal 14 display a screen for notifying that communication with the management server 12 is possible. In this way, the information device 13 can notify the user that communication with the management server 12 is possible.

If the CPU 131 of the information device 13 receives an HTTP request, it specifies a PIN code included in the received HTTP request (STEP S41). Since the information device 13 can perform communication with the communication terminal 14 on the basis of a standardized protocol (HTTP), the CPU 131 can specify a PIN code by reliable communication.

Figure 8:
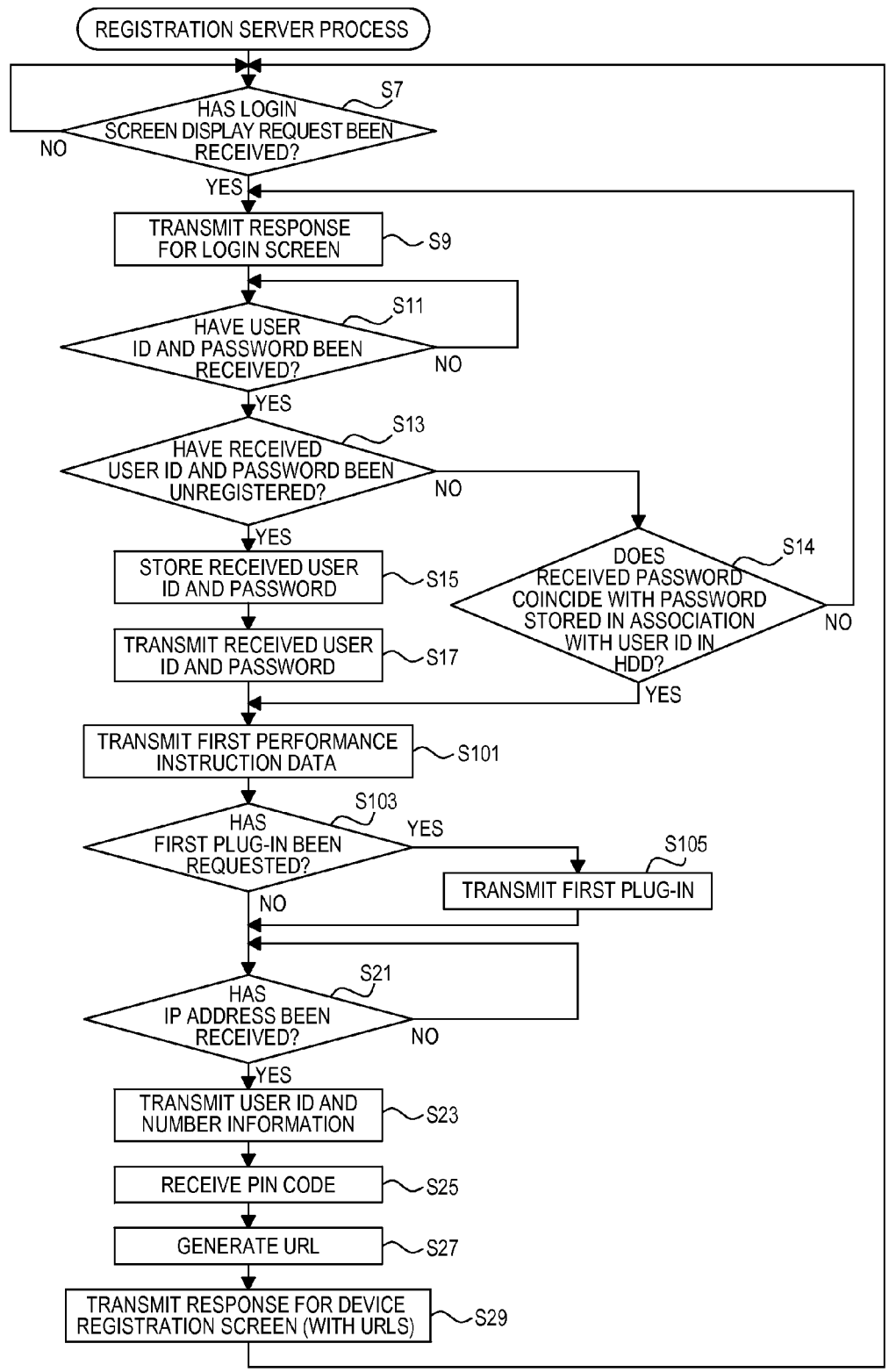
FIG. 8 is a flow chart illustrating a registration server process according to the first modification.
Figure 9:
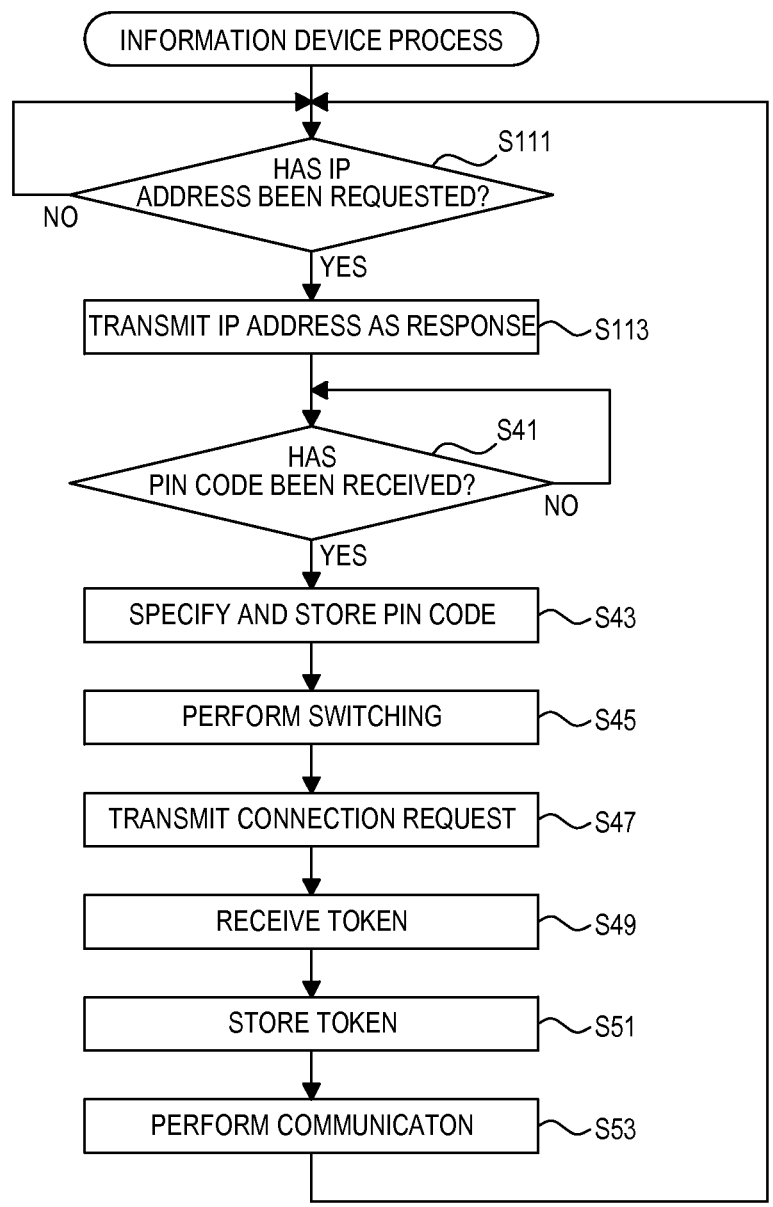
FIG. 9 is a flow chart illustrating an information device process according to the first modification.

Now, a first modification of the exemplary embodiment will be described with reference to FIGS. 7 to 9. First, a communication sequence according to the first modification will be described with reference to FIG. 7. The communication sequence according to the first modification is different from the above described embodiment in that instead of STEP S205 of FIG. 2 in which the registration server 11 makes the communication terminal 14 display the device registration screen without URLs, the registration server 11 makes the communication terminal 14 execute an installed first plug-in. The first plug-in makes the communication terminal 14 perform a process of receiving an IP address from the an information device 13 and transmitting the IP address to the management server 12.

More specifically, if an HTTP request including a user ID and a password is received from the communication terminal 14 in STEP S203, in STEP S301, the registration server 11 transmits instruction data (hereinafter, referred to as first performance instruction data) for making the communication terminal 14 execute the installed first plug-in, to the communication terminal 14. The first performance instruction data is a code which is included in a markup language such as HTML and instructs execution of the first plug-in. If the communication terminal 14 receives the first performance instruction data, it executes the first plug-in. By executing the first plug-in, the communication terminal 14 receives IP addresses from all of the plurality of information devices 13 connected to the second network 3, on the basis of a Simple Network Management Protocol (SNMP). More specifically, in STEP S303, the communication terminal 14 broadcasts a request command (GetRequest) for requesting transmission of IP addresses, to all of the plurality of information devices 13 connected to the second network 3. Each of the plurality of information devices 13 transmits a response (GetResponse) including its IP address, to the communication terminal 14. Then, the communication terminal 14 receives the response commands transmitted from the plurality of information devices 13, respectively (STEP S305). Thereafter, the communication terminal 14 specifies the IP addresses included in the received response commands. The communication terminal 14 transmits an HTTP request including the specified IP addresses, to the registration server 11. If the registration server 11 receives the HTTP request (STEP S209), it specifies the IP addresses. The other communication is the same as that in the communication sequence of FIG. 2, and thus will not be described.

Now, a registration server process which is performed by the CPU 111 of the registration server 11 will be described with reference to FIG. 8. The same part as that of the registration server process of FIG. 4 will not be described or will be described briefly. After the CPU 111 confirms that the user of the communication terminal 14 having transmitted the user ID and the password has been registered (STEPS S13, S14, S15, and S17), in STEP S101, the CPU 111 transmits the first performance instruction data to the communication terminal 14. At this time, the CPU 111 includes acquisition destination information in the first performance instruction data. In a case where the communication terminal 14 does not have the first plug-in installed, the communication terminal 14 can use the acquisition destination information to acquire the first plug-in. In the case where the communication terminal 14 does not have the first plug-in installed, if the communication terminal 14 receives the first performance instruction data, it transmits first plug-in request data designating the acquisition destination information included in the first performance instruction data, to the registration server 11. In a case where the CPU 111 receives the first plug-in request data from the communication terminal 14 ("YES" in STEP S103), in STEP S105, it transmits the first plug-in to the communication terminal 14. Then, the CPU 111 proceeds to STEP S21. If the communication terminal 14 receives the first plug-in, it installs the first plug-in in the HDD of the communication terminal 14, and executes the first plug-in, thereby receiving the IP addresses from the information devices 13 (STEPS S303 and S305) (see FIG. 7).

Figure 7:
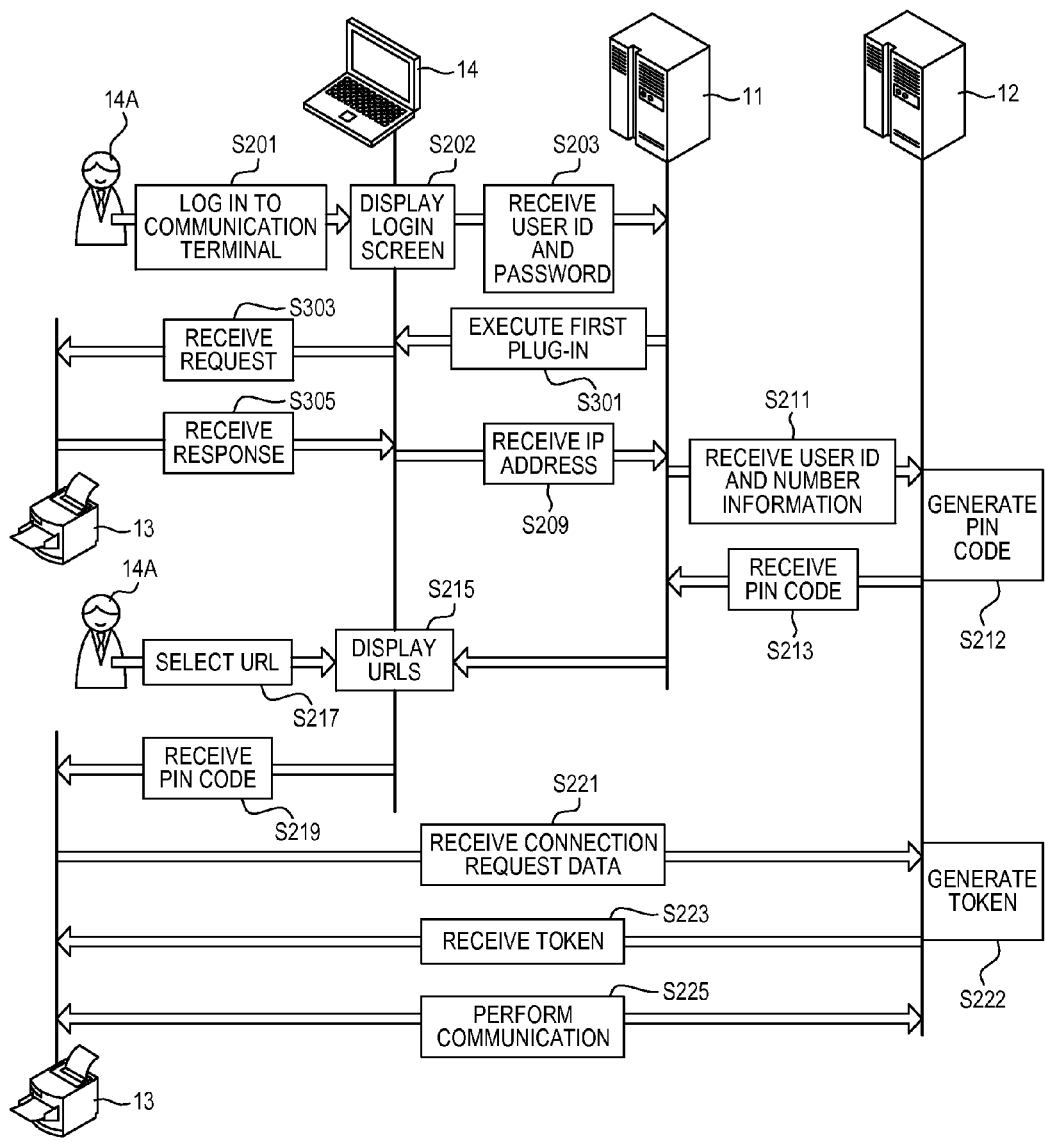
FIG. 7 is a view illustrating a communication sequence according to a first modification.

Meanwhile, in a case where the communication terminal 14 has the first plug-in installed, in response to reception of the first performance instruction data, it executes the first plug-in, thereby the IP addresses from the information devices 13 (STEPS S303 and S305) (see FIG. 7). In this case, the CPU 111 does not receive the first plug-in request data from the communication terminal 14 ("NO" in STEP S103). Then, the CPU 111 proceeds to STEP S21.

In STEP S21, the CPU 111 determines whether any HTTP request including the IP addresses has been received from the communication terminal 14. In a case where an HTTP request has been received ("YES" in STEP S21), the CPU 111 specifies the IP addresses included in the HTTP request, as the IP addresses of the information devices 13. The processes of STEPS S23 to S29 are the same as those of the registration server process of FIG. 4.

Also, unlike the above description, the communication terminal 14 may execute the first plug-in, thereby individually performing communication with each of the plurality of information devices 13 connected to the second network 3 so as to acquire its IP address. Alternatively, the communication terminal 14 may execute the first plug-in, thereby inquiring of a server (not shown) connected to the second network 3 so as to the IP address of each of the plurality of information devices 13.

Now, an information device process which is performed by the CPU 131 of an information device 13 will be described with reference to FIG. 9. The same part as that of the information device process of FIG. 5 will not be described or will be described briefly. In STEP S111, the CPU 131 determines whether any request command for requesting transmission of the IP address has been received from the communication terminal 14 by communication based on SNMP. In a case where any request command has not been received ("NO" in STEP S111), the CPU 131 returns to STEP S111. Meanwhile, in a case where a request command has been received ("YES" in STEP S111), in STEP S113, the CPU 131 transmits a response command including the IP address, to the communication terminal 14 which is the transmission source of the request command. Thereafter, if an HTTP request including a PIN code is received from the communication terminal 14 ("YES" in STEP S41), in STEP S43, the CPU 131 specifies the PIN code included in the received HTTP request, and stores the PIN code in the RAM 133. Then, the CPU 131 performs the processes of STEPS S45 to S53 for starting communication with the management server 12. The processes of STEPS S45 to S53 are the same as those of the information device process of FIG. 5.

A management server process which the CPU 121 of the management server 12 performs in the first modification is the same as the management server process (see FIG. 6) of the above described embodiment, and thus will not be described.

As described above, if the communication terminal 14 receives the first performance instruction data from the registration server 11, in response to this instruction, it executes the first plug-in, thereby receiving the IP addresses from the information devices 13. The registration server 11 can install the first plug-in in the communication terminal 14, thereby making the communication terminal 14 execute the first plug-in. In this case, the user does not need to perform an operation of inputting the IP addresses to the input sections of the device registration screen, on the communication terminal 14. Therefore, the registration server 11 can facilitate the procedure of receiving the IP addresses from the information devices 13.

If the CPU 131 of an information device 13 receives a request command based on SNMP ("YES" in STEP S111), the CPU 131 transmits a response command based on SNMP, as a response (STEP S113), thereby transmitting its IP address to the communication terminal 14. Since each information device 13 can perform communication with the communication terminal 14 on the basis of a standardized protocol (SNMP), it can transmit its IP address by reliable communication.

Now, a second modification of the exemplary embodiment will be described with reference to FIGS. 10 and 11. First, a communication sequence according to the second modification will be described with reference to FIG. 10. The communication sequence according to the second modification is different from the above described first modification in that instead of STEP S215 of FIG. 7 in which the registration server 11 makes the communication terminal 14 display a device registration screen with URLs, the registration server 11 makes the communication terminal 14 execute an installed second plug-in. The second plug-in makes the communication terminal 14 perform a process for transmitting an HTTP request including a PIN code to the information devices 13.

More specifically, if the registration server 11 receives a PIN code from the management server 12 in STEP S213, in STEP S309, it transmits second performance instruction data for making the communication terminal 14 execute the second plug-in, to the communication terminal 14. The second plug-in can make the communication terminal 14 perform a process of transmitting the PIN code received in STEP S213, to an information device 13 having an IP address received in STEP S209. The second performance instruction data includes the IP address received in STEP S209, the PIN code received in STEP S213, and acquisition destination information. In a case where the communication terminal 14 does not have the second plug-in installed, the communication terminal 14 can use the acquisition destination information to acquire the second plug-in. In the case where the communication terminal 14 does not have the second plug-in installed, if the communication terminal 14 receives the second performance instruction data, it installs the second plug-in.

Thereafter, the communication terminal 14 executes the second plug-in. By executing the second plug-in, the communication terminal 14 transmits a command including the PIN code received in STEP S213 by the registration server 11, to the information device 13 having the IP address received in STEP S209 by the registration server 11, by communication based on SNMP. In a case where the registration server 11 has received a plurality of IP addresses in STEP S209, the communication terminal 14 transmits the command including the PIN code to each of the plurality of information devices 13 having the plurality of IP addresses, respectively. Then, in STEP S219, the information device 13 receives the command. The information device 13 stores the PIN code included in the command, in RAM 133. Thereafter, the information device 13 performs communication with the management server 12 for starting communication with the management server 12 (STEPS S221, S223, and S225).

Also, unlike the above description, the communication terminal 14 may execute the second plug-in, thereby transmitting an HTTP request including the PIN code to the information device 13. If the information device 13 receives the HTTP request, it may store the PIN code included in the HTTP request, in the RAM 133. In either case, since the information device 13 can perform communication with the communication terminal 14 on the basis of a standardized protocol (SNMP or HTTP), it can receive the PIN code by reliable communication.

Now, a registration server process which is performed by the CPU 111 of the registration server 11 will be described with reference to FIG. 11. The same part as that of the registration server process of FIG. 8 will not be described or will be described briefly. If the CPU 111 receives the HTTP request including the IP address from the communication terminal 14 ("YES" in STEP S21), it transmits the user ID and the number information to the management server 12 in STEP S23, and receives the PIN code in STEP S25. Thereafter, in STEP S106, the CPU 111 generates the second performance instruction data, which includes the IP address received in STEP S21, the PIN code received in STEP S25, and acquisition destination information. In a case where the communication terminal 14 does not have the second plug-in installed, the communication terminal 14 can use the acquisition destination information to acquire the second plug-in. Next, in STEP S107, the CPU 111 transmits the second performance instruction data to the communication terminal 14.

In the case where the communication terminal 14 does not has the second plug-in installed, if the communication terminal 14 receives the second performance instruction data, it transmits second plug-in request data designating the acquisition destination information included in the second performance instruction data, to the registration server 11. If the second plug-in request data is received from the communication terminal 14 ("YES" in STEP S109), the CPU 111 transmits the second plug-in to the communication terminal 14 (STEP S111). If receives the second plug-in, the communication terminal 14 installs the second plug-in in the HDD of the communication terminal 14. Then, the CPU 111 returns to STEP S27. The communication terminal 14 executes the installed second plug-in, thereby transmitting the command including the PIN code to the information device 13 in STEP S219 (see FIG. 10). As a result, the information device 13 becomes able to perform predetermined communication with the management server 12, thereby acquiring the token, and performing communication with the management server 12.

Figure 10:
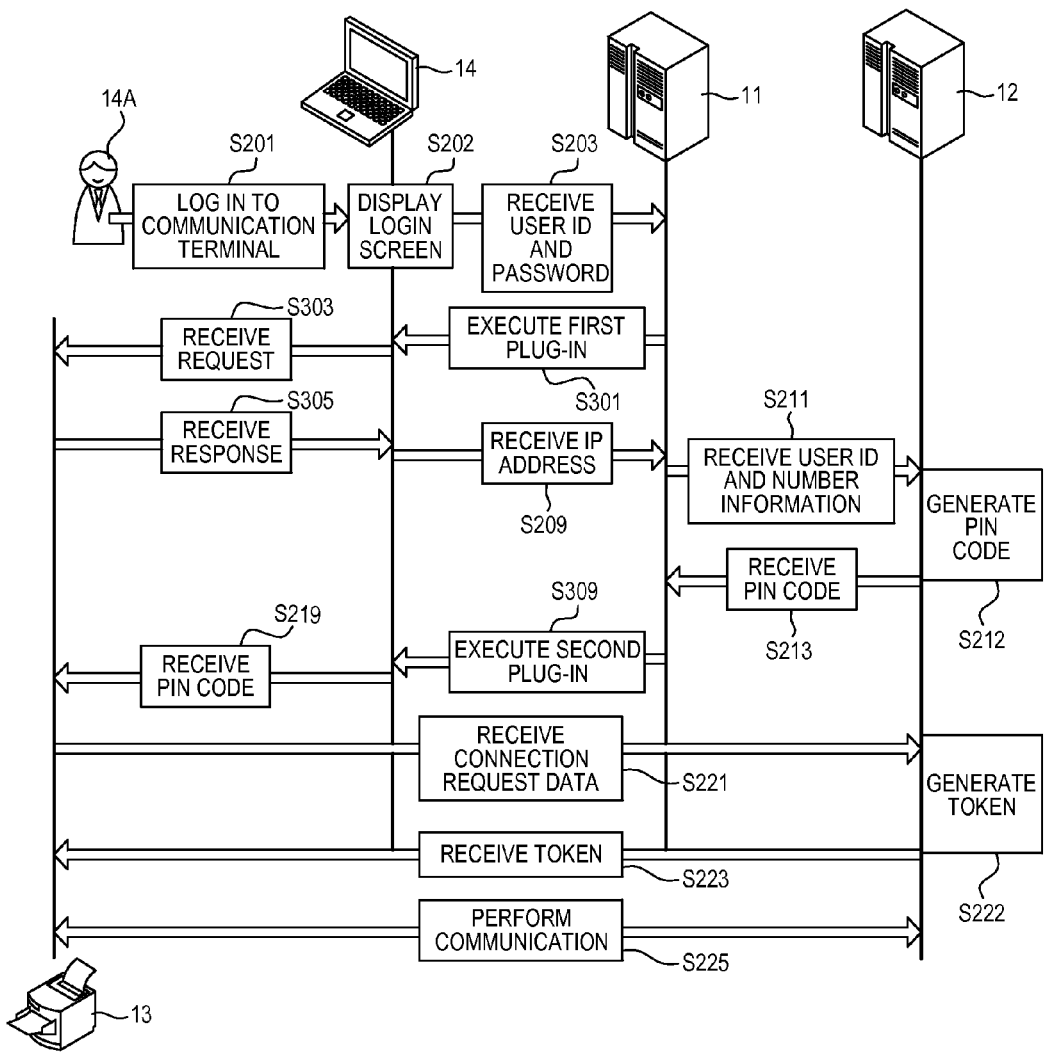
FIG. 10 is a view illustrating a communication sequence according to a second modification.
Figure 11:
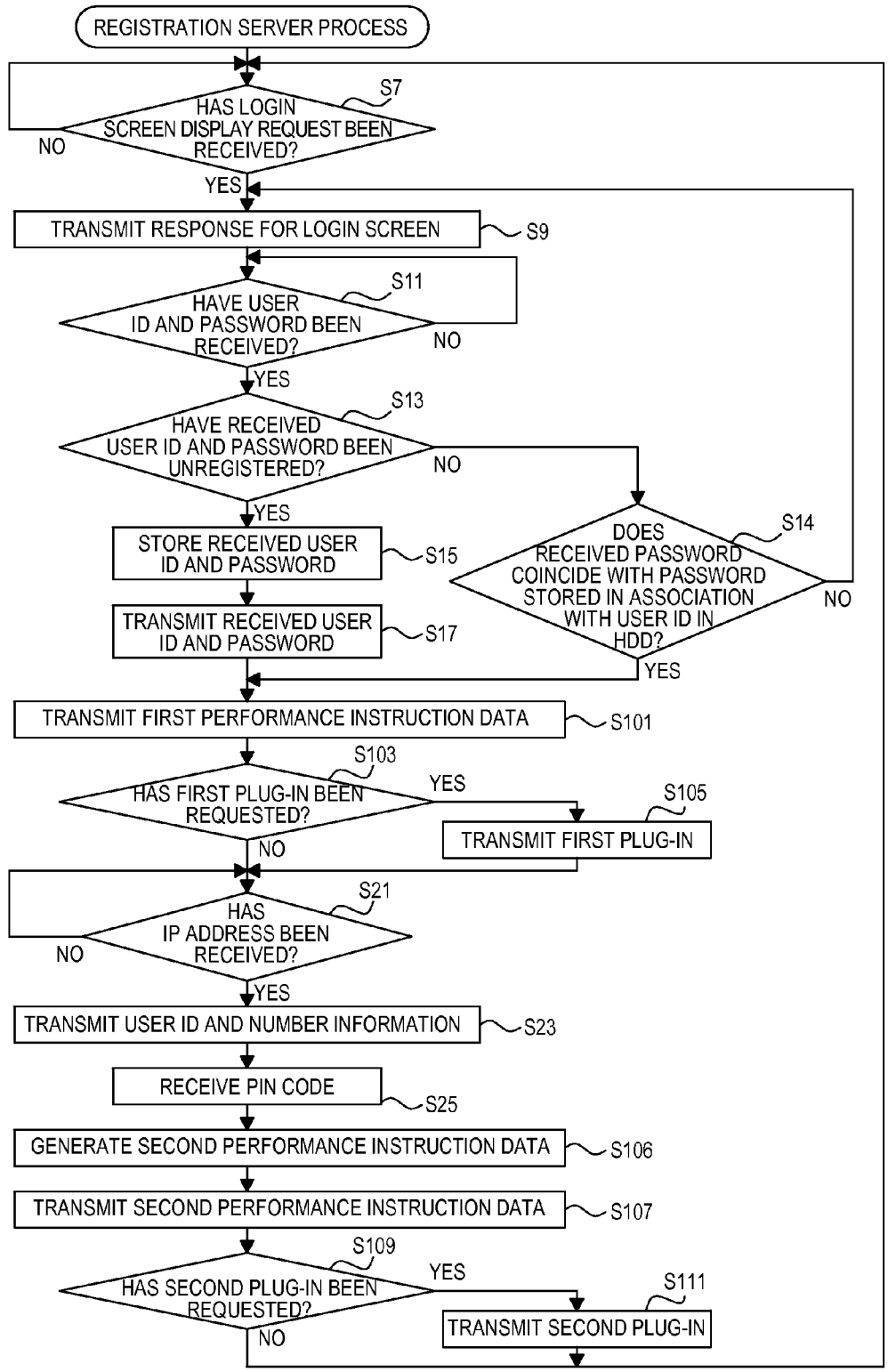
FIG. 11 is a flow chart illustrating a registration server process according to the second modification.

Meanwhile, in a case where the communication terminal 14 has the second plug-in, if the communication terminal 14 receives the second performance instruction data, it executes the second plug-in, thereby transmitting the command including the PIN code by communication based on SNMP in STEP S219 (see FIG. 10). In this case, the CPU 111 does not receive the second plug-in request data from the communication terminal 14 ("NO" in STEP S109). Then, the CPU 111 returns to STEP S7.

In the second modification, the management server process which is performed by the CPU 121 of the management server 12 is the same as the management server process (see FIG. 6) of the above described embodiment, and thus will not be described. Also, in the second modification, an information device process which is performed by the CPU 131 of each information device 13 is the same as the information device process (see FIG. 9) of the above described embodiment, and thus will not be described.

As described above, if the communication terminal 14 receives the performance instruction data from the registration server 11, in response to this instruction, it executes the second plug-in, thereby transmitting the PIN code to the information device 13. The registration server 11 can generate the second performance instruction data for making the communication terminal 14 execute the second plug-in, thereby making the communication terminal 14 install and execute the second plug-in. In this case, the user does not need to perform an operation of selecting an URL included in the device registration screen, on the communication terminal 14. Therefore, the registration server 11 can facilitate the procedure of the communication terminal 14 to transmit the PIN code to the information device 13.

Each user ID may be an example of user identification information. Each IP address may be an example of device identification information and first device identification information. Each device ID may be an example of second device identification information. Each PIN code may be an example of authentication information. Each token may be an example of permission information. Each URL which is generated in STEP S27, or performance instruction data which is generated in STEP S106 may be an example of registration information. The RAM 133 for storing PIN codes may be an example of a first storage unit. The flash memory 134 for storing tokens may be an example of a second storage unit. The data representing display screen for notifying that communication between the management server 12 and an information device 13 is possible may be an example of related information relating to the management server 12.

The present invention is not limited to the above described embodiment, and can be modified in various forms. A user ID which the CPU 111 of the registration server 11 receives in STEP S11 may be transmitted from a device other than the communication terminal 14. For example, to the first network 2, a guest information database server for managing the user IDs of users to use the network system 1 may be connected. A user ID may be transmitted from the guest information database server. The CPU 111 of the registration server 11 may receive a user ID from the guest information database server.

In STEP S23, the registration server 11 may transmit only a user ID to the management server 12 and may not transmit any number information to the management server 12. In STEP S73, the management server 12 may generate a PIN code capable of authenticating an arbitrary number of information devices 13.

The first plug-in and the second plug-in may be included in a common plug-in. In this case, the communication terminal 14 may execute the common plug-in, thereby performing both of the process in a case of executing the first plug-in and the process in a case of executing the second plug-in.

Each information device 13 may display information representing the state of the corresponding information device 13, on the display unit 136 of the corresponding information device 13, not on the display unit of the communication terminal 14. Also, each information device 13 may display information representing the state of the corresponding information device 13 on the display unit of the communication terminal 14 and on the display unit 136 of the corresponding information device 13, at the same time.

In a case where an information device 13 receives the display request from the communication terminal 14, if necessary, it may transmit any one of the second data and the third data on the display screens for notifying whether communication between the management server 12 and the corresponding information device 13 is possible, together with the first data on the display screen for receiving an input for a setting parameter of the information device 13, to the communication terminal 14. That is, if an information device 13 receives the display request from the communication terminal 14 in a state where any PIN code has not been stored in the RAM 133, the information device 13 may transmit the second data on the display screen (for example, a display screen including a character string "CONNECTION WITH MANAGEMENT SERVER HAS NOT BEEN ESTABLISHED") for notifying that communication with the management server 12 is impossible, together with the first data on the above described display screen, to the communication terminal 14. Meanwhile, if an information device 13 receives the display request from the communication terminal 14 in a state where a PIN code has been received from the management server 12 and has been stored in the RAM 133, the information device 13 may transmit the third data on the display screen for notifying that communication with the management server 12 is possible, together with the first data on the above described display screen, to the communication terminal 14. The display contents which an information device 13 makes the display unit of the communication terminal 14 display is not limited to the display screens based on the first and second data. For example, in the display screen for notifying that communication with the management server 12 is possible, the domain name of the management server 12 may be displayed.

The management server 12 may generate an encryption key, instead of a PIN code. In this case, the management server 12 may transmit the encryption key to an information device 13 through the registration server 11 and the communication terminal 14. The management server 12 may use the encryption key to authenticate the corresponding information device 13.

An information device 13 may include a user ID in the connection request data, and transmit the connection request data to the management server 12. The user ID may be input to the information device 13 in advance by the user who manages the information device 13. If the management server 12 receives the connection request data, it may determine whether the user ID and the PIN code included in the connection request data are in the HDD 124 in association with each other. Then, the management server 12 may generate a token only in a case where the user ID and the PIN code included in the connection request data are in the HDD 124 in association with each other.

What is claimed is:

1. A non-transitory computer-readable recording medium storing a program when executed by a computer for controlling a registration server configured to be connected to a first network, causing the computer to execute:
- receiving user identification information;
- receiving device identification information from a communication terminal connected to a second network different from the first network, the device identification information identifying, on the second network, an information device connected to the second network;
- transmitting the received user identification information, received by the registration server, to a management server connected to the first network;
- receiving, from the management server, authentication information which is transmitted from the management server as a response to the transmitted user identification information;
- generating registration information which has a format in which the authentication information is allowed to be registered in the information device, the registration information including at least the authentication information and the device identification information; and
- transmitting the generated registration information to the communication terminal so as to transmit a connection request to the management server based on the received registration information.

2. The non-transitory computer-readable recording medium according to claim 1, wherein
the registration information is a uniform resource locator (URL) which includes at least the authentication information and the device identification information, and has a format which allows the information device to accept the authentication information.

3. The non-transitory computer-readable recording medium according to claim 2, wherein
the authentication information is included in the URL as a query.

4. The non-transitory computer-readable recording medium according to claim 2, wherein
the registration server receives the device identification information from the communication terminal by receiving a HyperText Transfer Protocol (HTTP) request including the device identification information from the communication terminal, and
in response to the HTTP request received from the communication terminal, the registration server transmits the registration information to the communication terminal by transmitting an HTTP response including the registration information.

5. The non-transitory computer-readable recording medium according to claim 1, wherein
the program when executed by the computer causes the registration server to:
transmit, to the management server, number information representing the number of information devices which are identified by the device identification information received by the registration server, and
generate as many pieces of registration information as a number represented by the transmitted number information.

6. The non-transitory computer-readable recording medium according to claim 1, wherein
the program when executed by the computer causes the registration server to:
transmit, to the communication terminal, a first plug-in which is a program executable by the communication terminal and is configured to acquire the device identification information from the information device, and
receive, from the communication terminal, the device identification information acquired by the first plug-in executed by the communication terminal.

7. The non-transitory computer-readable recording medium according to claim 6, wherein
the program when executed by the computer causes the registration server to generate, as the registration information, an instruction for causing the communication terminal to execute a second plug-in, which is a program executable by the communication terminal, and is configured to transmit the received authentication information to the information device.

8. An information device configured to be connected to a second network comprising:
a hardware processor; and
memory storing computer readable instructions, when executed by the processor, causing the information device to:
receive, after device identification information has been transmitted by a communication terminal connected to the second network to a registration server and after user identification information has been transmitted from the registration server to a management server, authentication information from the communication terminal, the authentication information being necessary to perform communication with the management server connected to a first network different from the second network, wherein the authentication information is received by the communication terminal from the registration server;
store the received authentication information in the memory;
transmit a connection request including the authentication information to the management server;
receive a permission information from the management server in response to the transmitted connection request, the permission information being used when the information device communicates with the management server; and
store the received permission information in the memory.

9. The information device according to claim 8, wherein
the computer readable instructions, when executed by the processor, causes the information device to:
set a state whether to permit to transmit related information to the communication terminal connected to the second network, the related information relating to the management server and stored in the memory, the state being selected from:
a prohibited state representing that the transmission of the related information is prohibited, the prohibit state being selected before the authentication information is received by the information device: and
a permitted state representing that the transmission of the related information is permitted, the permitted state being selected when the authentication information is received.

10. The information device according to claim 8, wherein the information device receives the authentication information by communication based on HTTP.

11. The information device according to claim 10, wherein the information device receives the authentication information as a query.

12. The information device according to claim 8, wherein the information device receives the authentication information by communication based on a Simple Network Management Protocol (SNMP).

13. The information device according to claim 8, wherein the computer readable instructions, when executed by the processor, causes the information device to:
receive, from the communication terminal, request data for requesting a device identification information for identifying the information device connected to the second network; and
transmit the device identification information to the communication terminal when the request data is received by the information device.

14. The information device according to claim 13, wherein the information device transmits the device identification information by communication based on SNMP.

15. The information device according to claim 8, wherein the memory includes a first storage unit in which the received authentication information is to be stored, and a second storage unit in which the received permission information is to be stored.

16. The information device according to claim 15, wherein the first storage unit is a RAM and the second storage unit is a flash ROM.

17. A non-transitory computer readable recording medium storing a program when executed by a computer for controlling an information device configured to be connected to a second network, causing the computer to execute:
receiving, after device identification information has been transmitted by a communication terminal connected to the second network to a registration server and after user identification information has been transmitted from the registration server to a management server, authentication information from the communication terminal, the authentication information being necessary to perform communication with the management server connected to a first network different from the second network, wherein the authentication information is received by the communication terminal from the registration server;
storing the received authentication information in a first storage unit;
transmitting a connection request including the authentication information to the management server;
receiving a permission information from the management server in response to the transmitted connection request, the permission information being used when the information device communicates with the management server; and
storing the received permission information in a second storage unit.

18. A network system comprising:
a registration server connected to a first network;
a management server connected to the first network; and
an information device connected to a second network different from the first network,
wherein
the registration server includes:
a first processor; and
first memory storing computer readable instructions, when executed by the first processor, causing the registration server to:
receive user identification information;
receive first device identification information from a communication terminal connected to the second network, the first device identification information identifying the information device on the second network;
transmit, to the management server, the user identification information received by the registration server;
receive authentication information from the management server when the management server transmits the authentication information as a response to the user identification information transmitted by the registration server;
generate registration information which has a format in which the authentication information is allowed to be registered in the information device, the registration information including at least the authentication information and the first device identification information; and
transmit the generated registration information generated to the communication terminal,
the information device includes:
a second processor; and
second memory storing computer readable instructions, when executed by the second processor, causing the information device to:
receive the authentication information from the communication terminal;
store the authentication information received from the communication terminal, in the second memory;
transmit a connection request to the management server, the connection request including the authentication information and a second device identification information for identifying the information device;
receive permission information from the management server in response to the transmitted connection request, the permission information permitting the information device to perform secure communication with the management server; and
store the received permission information in the second memory, and
the management server includes:
a third processor; and
third memory storing computer readable instructions, when executed by the third processor, causing the management server to:
receive the user identification information from the registration server;
generate the authentication information corresponding to the user identification information in response to receipt of the user identification information from the registration server;
transmit the generated authentication information to the registration server;
store the user identification information received from the registration server and the generated authentication information in the third memory in association with each other;
receive the connection request from the information device;
determine whether the authentication information included in the received connection request is in the third memory;
generate the permission information when it is determined that the authentication information is in the third memory;
transmit the generated permission information to the information device; and
store the second device identification information included in the connection request received by the management server and the generated permission information in the third memory in association with the user identification information and the authentication information which are stored in the third memory in association with each other.

19. The network system according to claim 18, wherein the second memory includes a first storage unit in which the received authentication information is to be stored, and a second storage unit in which the received permission information is to be stored.

20. The network system according to claim 19, wherein the first storage unit is a RAM and the second storage unit is a flash ROM.

* * * * *